UNITED STATES PATENT OFFICE.

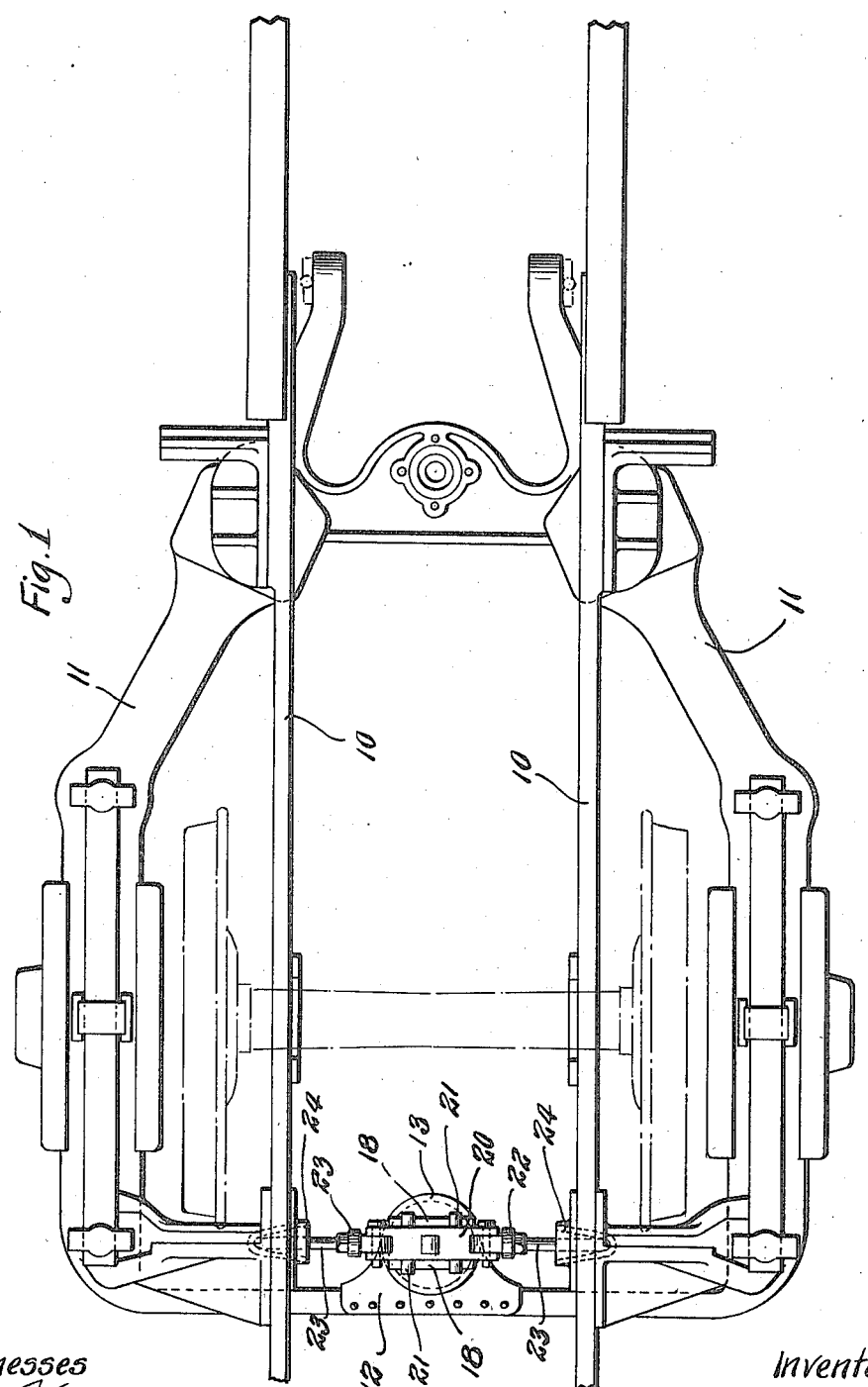

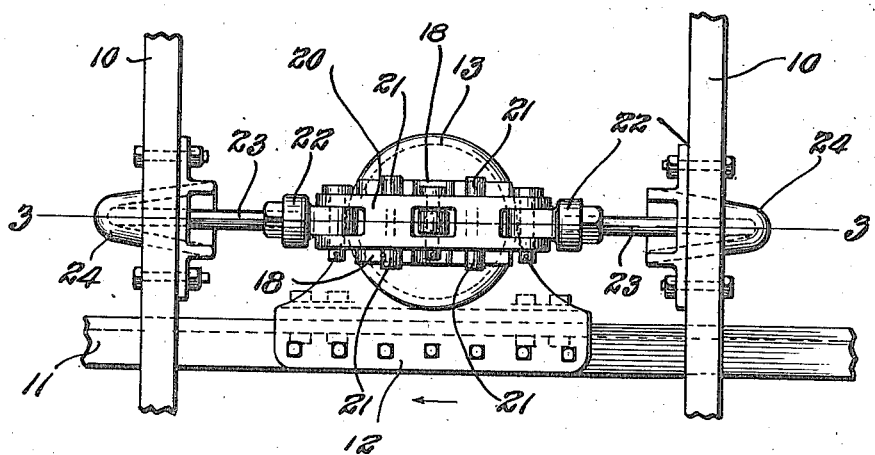
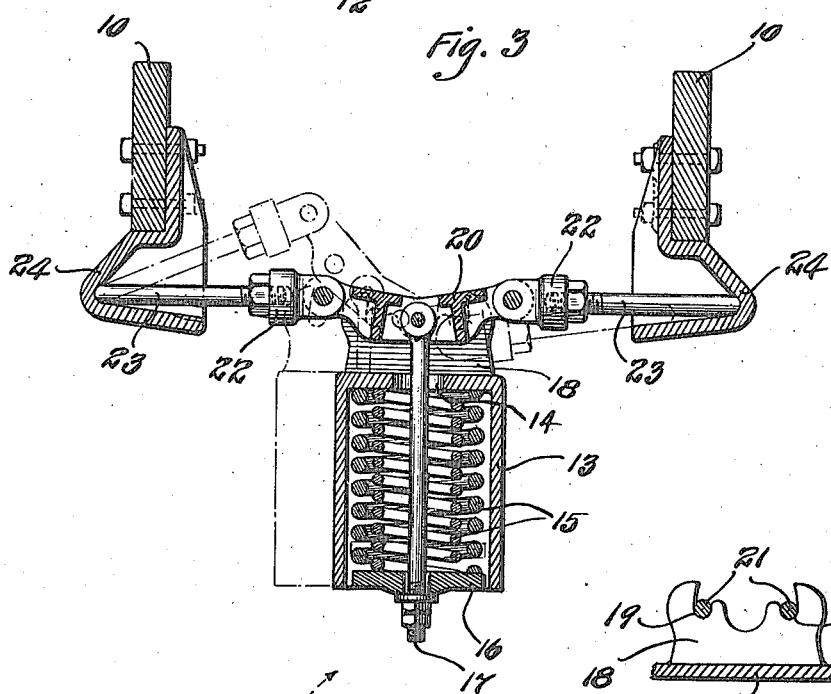
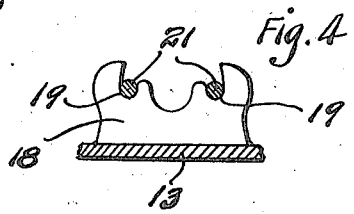
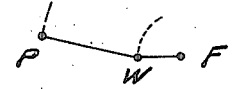

CHARLES F. FREDE, OF ST. LOUIS, MISSOURI, ASSIGNOR TO COMMONWEALTH STEEL COMPANY, OF ST. LOUIS, MISSOURI, A CORPORATION OF NEW JERSEY.

TRAILER-TRUCK-CENTERING DEVICE FOR LOCOMOTIVES.

1,152,164.  Specification of Letters Patent.  Patented Aug. 31, 1915.

Application filed November 16, 1914. Serial No. 872,408.

*To all whom it may concern:*

Be it known that I, CHARLES F. FREDE, a citizen of the United States, residing at the city of St. Louis, State of Missouri, have invented a certain new and useful Improvement in Trailer-Truck-Centering Devices for Locomotives, of which the following is a full, clear, and exact description, such as will enable others skilled in the art to which it appertains to make and use the same, reference being had to the accompanying drawings, forming part of this specification, in which—

Figure 1 is a top plan view of a locomotive trailer truck which is equipped with a centering device of my improved construction. Fig. 2 is an enlarged plan view of the centering device. Fig. 3 is a transverse section taken approximately on the line 3—3 of Fig. 2. Fig. 4 is a detail sectional view showing one of the bearings for the trunnions of a rocking block made use of in connection with my improved centering device. Fig. 5 is a diagrammatic view illustrating the leverage which is effected by certain of the parts of my improved device.

My invention relates generally to the trailer trucks of locomotives and more particularly to a centering device which is carried by the trailer truck and coöperates with the locomotive frame for holding said truck in normal central position.

It will be understood that while a locomotive is running on straight track it is desirable that the wheels of the trailer truck be maintained in alinement with the other wheels of the locomotive and to accomplish this result, yielding pressure means in the form of springs are utilized, which springs must, of necessity, be of sufficient strength to maintain with a certain amount of resistance, the trailer truck in central position. When traversing a curve in the track, the trailer truck swings on the pivot at its front end and the rear portion of said truck moves transversely with respect to the locomotive frame. This transverse movement is resisted by the centering springs and when the locomotive passes from the curve onto straight track, the springs return the trailer truck to its normal central position, which movement brings the trailer truck wheels into alinement with the other wheels of the locomotive. This action necessitates a spring of normally high resistance so as to maintain the trailer truck in central position on straight track and to resist any tendency of the truck to get out of alinement after it has started to move transversely, and on a curve it is desirable that this normally high initial resistance be overcome so as to permit the truck to move more freely.

It is the principal object of my invention to provide a comparatively simple, inexpensive centering device, which can be readily combined with a locomotive trailer truck and which will be effective in holding the truck in central position when the locomotive is on straight track and which device will automatically act to overcome the resistance offered by the yielding pressure means forming a part of the device when the truck swings laterally with respect to the truck frame, as is the case when the locomotive traverses a curve.

With the foregoing and other objects in view, my invention consists in certain novel features of construction and arrangement of parts hereinafter more fully described and claimed.

Referring by numerals to the accompanying drawings, 10 designates longitudinal members forming a part of the locomotive frame and to which is pivotally connected at its forward end, the trailer truck frame 11. Rigidly fixed in any suitable manner to the rear portion of this truck frame and preferably to the rear transverse rail is a bracket 12 and formed integral therewith or fixed thereto is a spring housing 13 preferably in the form of a vertically disposed cylinder open at its lower end and provided at its upper end with a centrally disposed opening 14. Located in this housing is one or more compression springs 15, the lower ends of which rest on a spring plate 16, the same being carried by the lower end of a vertically disposed rod 17, the upper portion of which projects through the opening 14. Formed integral with or fixed to the top of the housing 13 is a pair of transversely disposed webs 18, and formed in the tops of these webs are bearings 19, the same being arranged in pairs. A transversely disposed rocking block 20 is positioned above the housing 13 between the webs 18, and formed integral with or fixed to said block are outwardly projecting pairs of bearing lugs or trunnions 21 which engage in the bearings 19. The upper end of rod 17 is pivotally connected to the central portion of the block 20 and pivotally connected to the ends of said block are sockets 22 which receive the inner ends of thrust rods 23. The outer ends of these thrust rods are loosely seated in tapered sockets 24 which are fixed in any suitable manner to the locomotive frame bars 10.

Under normal conditions and when the locomotive is running on straight track the trailer truck frame occupies a central position relative to the locomotive frame and consequently the wheels of the trailer truck are in alinement with the other wheels of the locomotive. The parts of the device are formed so that under such normal conditions the outer ends of the thrust rods 23 bear against the inner ends of the sockets 24. The springs 15 which are under compression, yieldingly resist any tendency of the rear portion of the trailer truck frame to move laterally with respect to the locomotive frame, such conditions being maintained as long as the rocking block occupies its horizontal position with the pairs of trunnions or bearing lugs 21 in the bearings 19.

When the rear portion of the trailer truck frame moves laterally relative to the locomotive frame the block 20 will necessarily be rocked on one of its pairs of trunnions, which movement is brought about by the shortening of the distance between the centering device and one of the sockets 24, and this movement necessarily swings the inner end of one of the thrust rods 23 upwardly, consequently elevating the corresponding end of the block 20. Thus, the rocking block becomes a lever with the pair of trunnions adjacent to the end which moves downward, acting as a fulcrum, the rod 17 and springs constituting the weight, and the power being applied to that end of said block that is raised. (See Fig. 5.) During this movement, the rod 17 is drawn upward a short distance, consequently compressing the spring 15 to a slight degree, but owing to the movement of said rocking block, the leverage thereof upon the rod 17 gradually increases, and as a result, the resistance offered by the spring is gradually overcome. During this movement, the gradual increase of leverage of the rocking block is proportionately greater than the increase in resistance offered by the spring, and consequently, the sidewise movement of the truck frame becomes easier as it increases or approaches its limit of transverse movement.

A centering device of my improved construction is comparatively simple, can be readily applied to trailer truck frames now in general use and said device is very effective in maintaining a trailer truck in central position and in yieldingly resisting the transverse movement of said truck frame during the passage of a locomotive around curves in the track.

It will be readily understood that minor changes in the size, form and construction of the various parts of my improved centering device may be made and substituted for those herein shown and described, without departing from the spirit of my invention, the scope of which is set forth in the appended claims.

I claim:

1. The combination with a locomotive frame and a locomotive trailer truck frame, of resilient means directly connected to and carried by the trailer truck frame, and means coöperating with said resilient means and adapted to be engaged by the locomotive frame for causing the resilient means to offer high initial and gradually diminishing resistance to the transverse movement of the truck from its normal central position.

2. In a trailer truck centering device, a spring, a rocking member connected to said spring directly connected to and carried by the trailer truck, which rocking member is provided with a pair of fulcrums, a flexible connection between said rocking block and the frame of the locomotive with which the center device is associated.

3. The combination with a trailer truck frame and locomotive frame, of resilient means directly connected to and carried by the trailer truck frame, a lever connected to said resilient means, which lever is provided with a plurality of fulcrums, and means connected to said lever and adapted to be engaged by the locomotive frame for causing the resilient means to offer high initial and gradually diminishing resistance to the transverse movement of the truck from its normal central position.

4. A locomotive trailer truck centering device comprising a spring directly connected to and carried by the frame of the trailer truck, a lever connected to and coöperating with said spring, which lever is provided with a plurality of fulcrums, and thrust rods connected to said lever and adapted to be engaged by the locomotive frame with which the trailer truck frame is associated when said trailer truck frame moves laterally from its normal central position.

5. A trailer truck centering device comprising a spring directly connected to and carried by the frame of the trailer truck, a lever connected to and coöperating with said spring, which lever is provided with a plurality of fulcrums, and thrust rods connected to said lever, and which thrust rods are normally in engagement with parts of the locomotive frame with which the device is associated.

6. In a device of the class described, a spring directly connected to and carried by a trailer truck frame, a lever connected to and coöperating with said spring, which lever is provided with fulcrums on opposite sides of the point of connection between said lever and spring, and thrust rods coöperating with said lever, and which thrust rods are adapted to be engaged by parts of the locomotive frame.

7. In a trailer truck centering device, a spring directly connected to and carried by said trailer truck, and means coöperating therewith and with the frame of the locomotive with which the device is associated for yieldingly maintaining the truck frame in normal central position and offering gradually diminishing resistance to the transverse movement of the truck frame.

8. In a trailer truck centering device, a spring connected directly to and carried by the trailer truck frame, a lever connected to said spring, and thrust rods connected to said lever, which thrust rods bear against parts carried by the locomotive frame.

9. In a trailer truck centering device, a spring directly connected to and carried by the trailer truck frame, a lever connected to said spring, socket members on the locomotive frame, and thrust rods connected to the lever and bearing against said socket members.

In testimony whereof I hereunto affix my signature in the presence of two witnesses, this 30th day of October, 1914.

CHARLES F. FREDE.

Witnesses:
M. P. SMITH,
M. A. HANDEL.